United States Patent
Groo

(10) Patent No.: US 6,826,250 B2
(45) Date of Patent: Nov. 30, 2004

(54) CLOCK DIVIDER WITH ERROR DETECTION AND RESET CAPABILITIES

(75) Inventor: Mark H. Groo, Scotts Valley, CA (US)

(73) Assignee: Seagate Technologies LLC, Scotts Valley, CA (US)

(*) Notice: Subject to any disclaimer, the term of this patent is extended or adjusted under 35 U.S.C. 154(b) by 495 days.

(21) Appl. No.: 10/028,047

(22) Filed: Dec. 19, 2001

(65) Prior Publication Data

US 2002/0131190 A1 Sep. 19, 2002

Related U.S. Application Data

(60) Provisional application No. 60/276,430, filed on Mar. 15, 2001.

(51) Int. Cl.[7] .............................................. H03K 21/00
(52) U.S. Cl. ......................................... 377/47; 377/46
(58) Field of Search .............................. 377/46, 47, 48

(56) References Cited

U.S. PATENT DOCUMENTS

| 5,488,646 | A |   | 1/1996 | Jones et al. |
| 5,920,216 | A |   | 7/1999 | Fischer |
| 6,097,783 | A | * | 8/2000 | Monk .......................... 377/47 |
| 6,114,887 | A |   | 9/2000 | Pathikonda et al. |
| 6,121,801 | A |   | 9/2000 | Lee |
| 6,151,323 | A |   | 11/2000 | O'Connell et al. |
| 6,163,541 | A |   | 12/2000 | Casey et al. |
| 6,204,694 | B1 |  | 3/2001 | Sunter et al. |
| 6,246,278 | B1 |  | 6/2001 | Anderson et al. |

* cited by examiner

Primary Examiner—Margaret R. Wambach
(74) Attorney, Agent, or Firm—Fellers, Snider, et al.

(57) ABSTRACT

Apparatus and method for generating a divided clock signal. A ring counter is provided with a sequence of output states. During steady-state operation, a different one of the output states is set at a first logical level and each of the remaining output states is set at a second logical level at each successive clock transition in a master clock signal. A gate network uses the respective logical levels of the output states to generate the divided clock signal. An error detection circuit outputs an error detection signal when a number of the output states at the first logical level is other than one, and proceeds to synchronously reset the ring counter when the error condition is detected. A programmable processor further asynchronously resets the ring counter in response to the error detection signal, as desired.

20 Claims, 8 Drawing Sheets

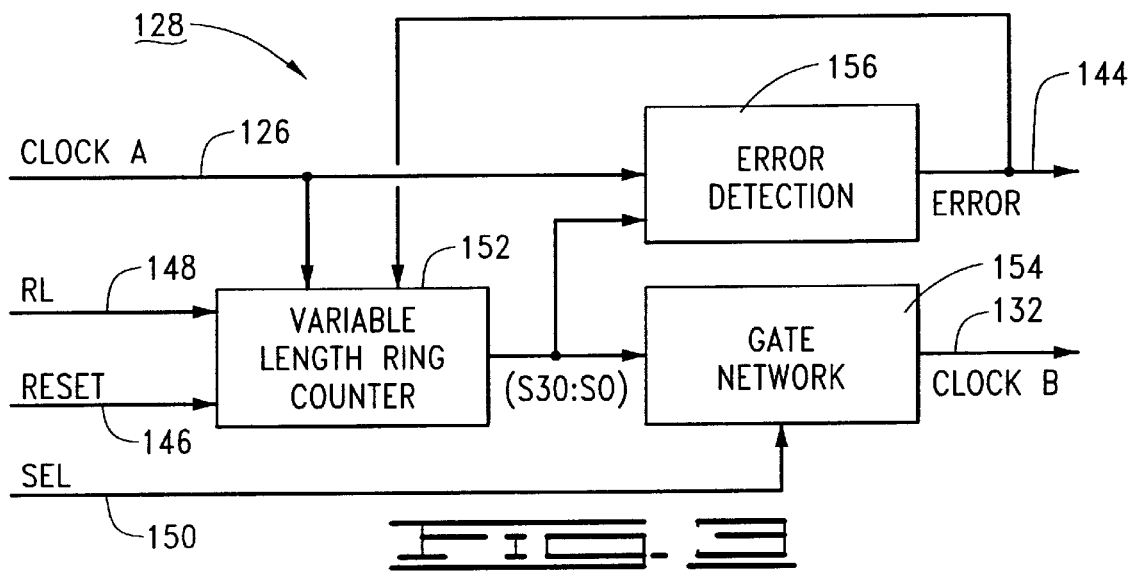
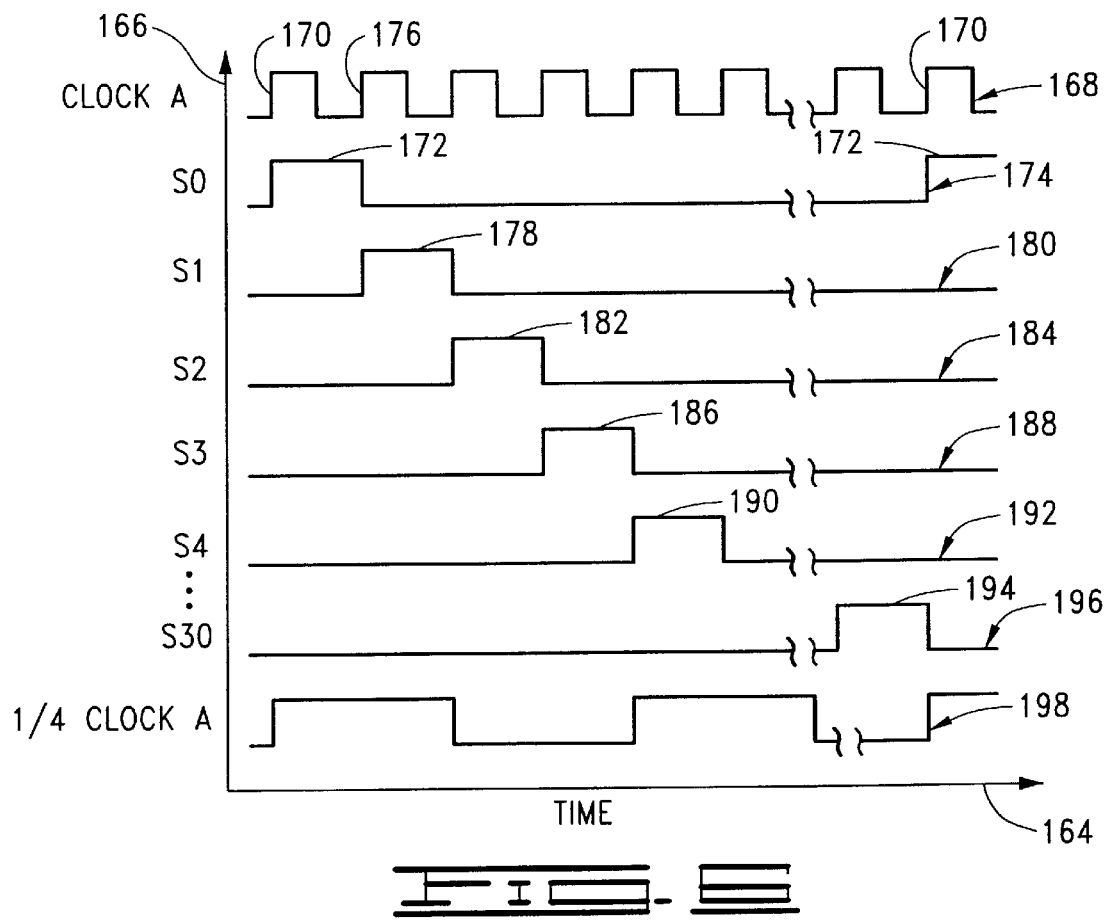

US 6,826,250 B2

CLOCK DIVIDER WITH ERROR DETECTION AND RESET CAPABILITIES

RELATED APPLICATIONS

This application claims the benefit of U.S. Provisional Application No. 60/276,430 filed Mar. 15, 2001.

FIELD OF THE INVENTION

The claimed invention relates generally to the field of digital circuits, and more particularly but not by way of limitation, to a clock divider circuit which generates a repetitive clock signal and which has error detection and both synchronous and asynchronous reset capabilities.

BACKGROUND

Clock signals are used throughout digital electronics systems to synchronize events communicated among various system integrated circuits (ICs). A master clock generator typically generates a master clock signal which is at a relatively high frequency. This master clock is divided down to provide various secondary clocks at secondary frequencies less than the master frequency. The secondary clocks are provided to various components throughout the system.

At an individual IC level, a phase locked loop (PLL) circuit is often used to generate internal clocks for use within the IC. The clocks generated by such PLL circuits are typically synchronized to an external master clock or other reference.

Reliable operation of an electronic system depends in large measure on accurate clock signals. However, for a variety of reasons clock dividers can undesirably provide outputs that are orders of magnitude off from the target clock frequency. Heretofore, there has not been a practical way to detect, report and correct such erroneous outputs, especially when the clock signals are generated and used internally within an IC.

Accordingly, there is a need in the art for an improved clock divider circuit with the capability of detecting and resetting an erroneous output condition

SUMMARY OF THE INVENTION

In accordance with preferred embodiments, a clock divider circuit is used to generate a divided clock signal from a master clock signal. The clock divider circuit includes a ring counter comprising a ring of serially connected elements clocked by a master clock signal. Each element has a corresponding output state.

During steady-state operation, a different one of the output states is set at a first logical level (such as a logical 1) and each of the remaining output states is set at a second logical level (such as a logical 0) at each successive clock transition in the master clock signal. A gate network uses the respective logical levels of the output states to generate the divided clock signal.

An error detection circuit provides an error detection signal indicative of an error condition when a number of the output states at the first logical level is not equal to one. The error detection circuit further synchronously resets the ring counter so that one of the output states is set at the first logical level and the remaining output states are set at the second logical level in response to the detection of the error condition.

Preferably, the ring counter is further configured to be asynchronously reset by an external processor device in response to the error detection signal. The ring of elements preferably comprises a sequence of serially connected flip-flops each having an input and an output, wherein the output of each flip-flop in the sequence is connected to the input of the next flip-flop in the sequence. The ring counter is preferably characterized as a variable length ring counter so that the total number of available states exceeds the divider value; that is, less than all of the available flip-flops and associated output states can be selected during operation.

The error detection circuit preferably comprises an OR gate configured to perform a logical OR operation upon all of the states except for one, and comprises an AND gate configured to perform a logical AND operation upon the remaining one of said states. The result of the logical AND operation will be high if more than one output state is at the first logical level. The clock divider circuit is preferably embedded in an integrated circuit which further embeds a master clock generator circuit that generates the master clock signal.

These and various other features and advantages that characterize the claimed invention will be apparent upon reading the following detailed description and upon review of the associated drawings.

BRIEF DESCRIPTION OF THE DRAWINGS

FIG. 3 is a functional block diagram of one of the clock divider circuits of FIG. 2 constructed in accordance with preferred embodiments of the present invention.

FIG. 6 is a timing diagram generally illustrating operation of the variable length ring counter of FIG. 3.

DETAILED DESCRIPTION

Figure 1:
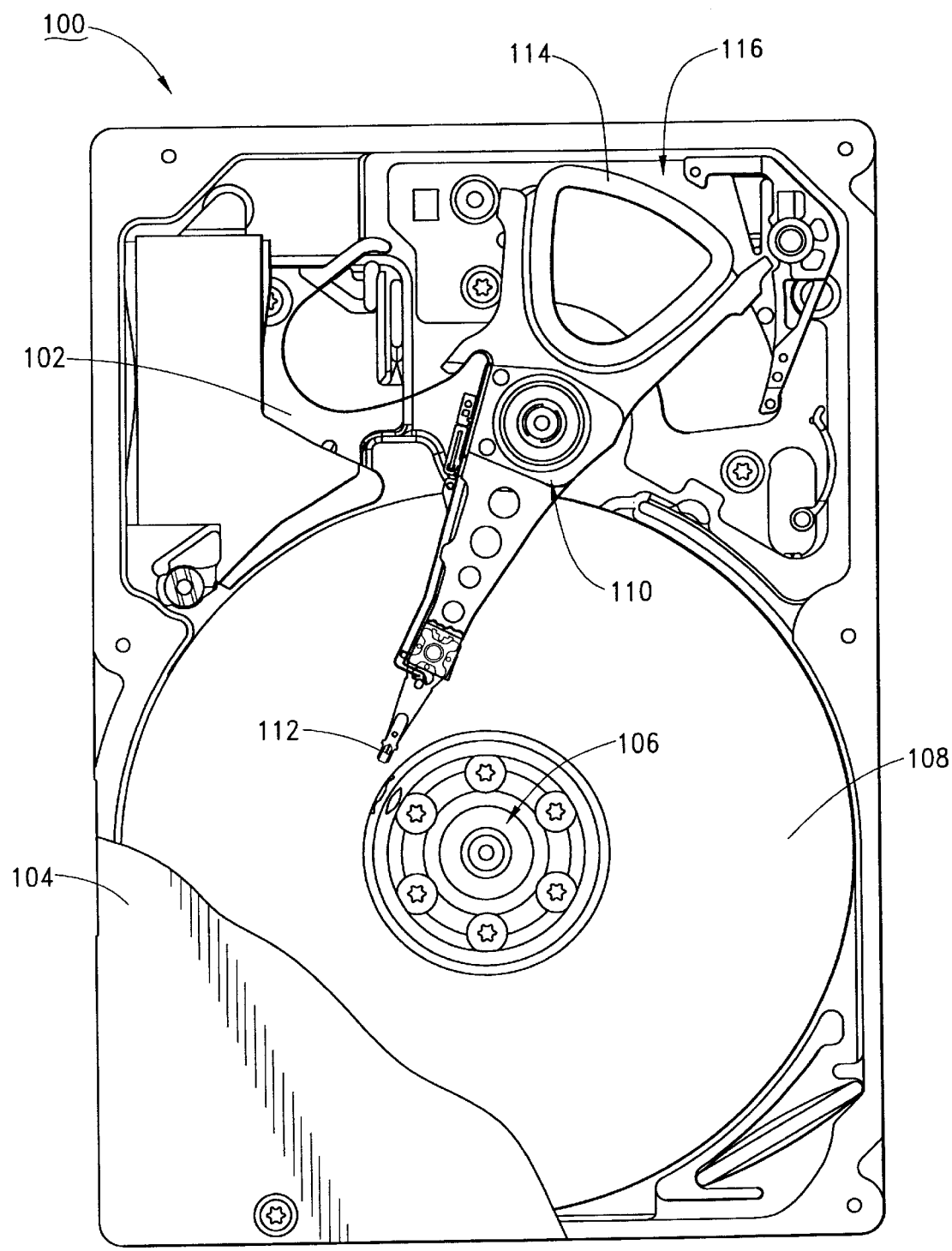
FIG. 1 is a top plan view of an exemplary disc drive incorporating a clock divider circuit constructed in accordance with preferred embodiments of the present invention.

To provide an exemplary environment in which various preferred embodiments of the present invention can be advantageously practiced, FIG. 1 shows a plan view of a disc drive 100 of the type used to magnetically store and retrieve digital data in a computer system. The disc drive 100 includes a base deck 102 and a top cover 104 (shown in partial cutaway) that cooperate to form a housing for the disc drive to enclose various disc drive components within an interior environment.

A spindle motor 106 rotates a number of rigid magnetic recording discs 108 at a constant high speed. A rotatable actuator 110 supports an array of data transducing heads 112 adjacent the discs 108. The heads 112 are used to write data to and read data from tracks (not shown) defined on the disc surfaces. The heads 112 are moved to various locations on the discs 108 through application of current to a coil 114 of a voice coil motor (VCM) 116.

Figure 2:
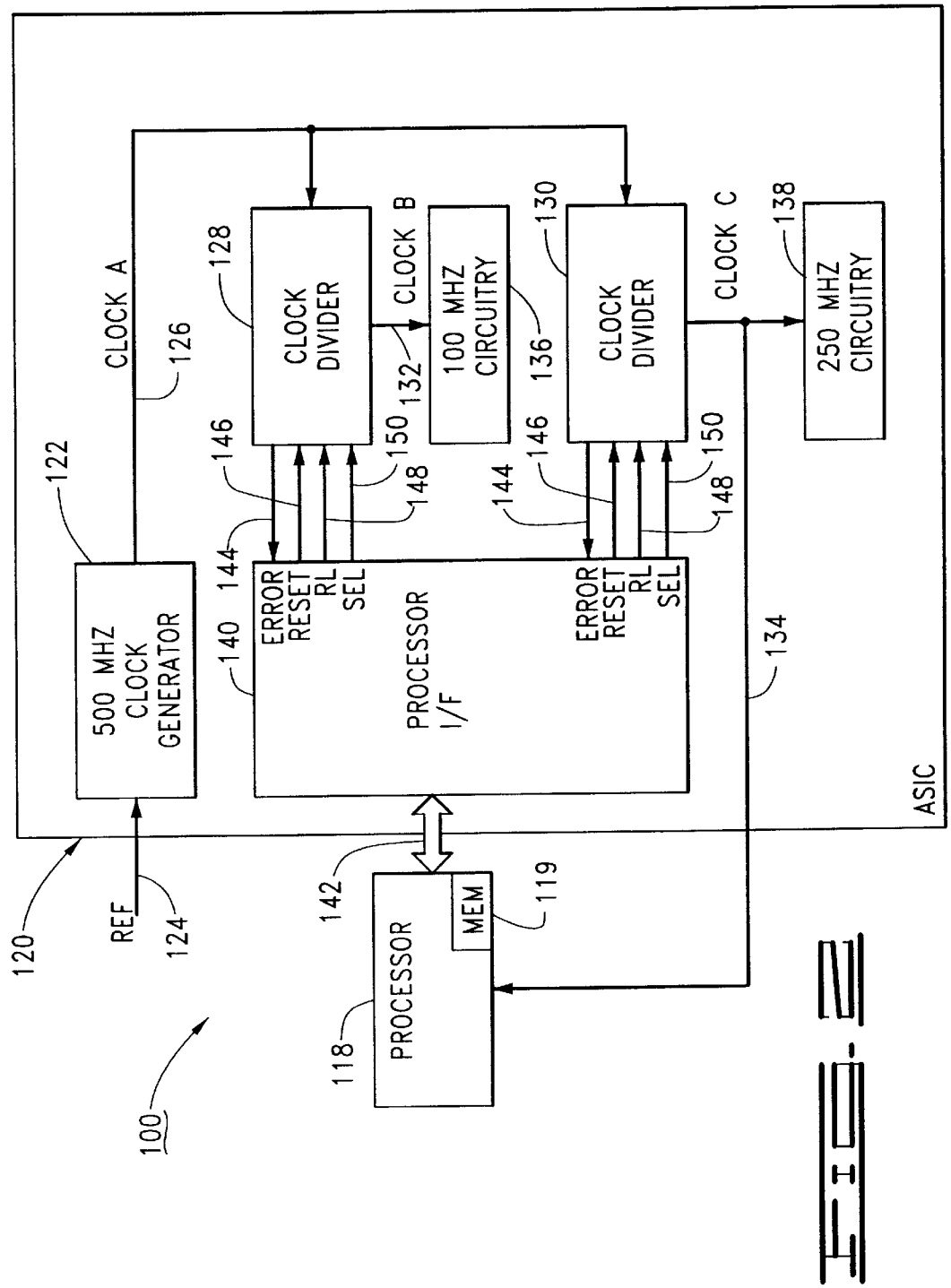
FIG. 2 is a functional block diagram of electronic circuitry of the disc drive of FIG. 1 including a programmable processor in communication with an application specific integrated circuit (ASIC) including a number of clock divider circuits constructed and operated in accordance with preferred embodiments of the present invention.

FIG. 2 provides a functional block diagram of relevant circuitry of the disc drive of FIG. 1. The circuitry in FIG. 2 is supported on a disc drive printed circuit board (PCB) which is mounted to the underside of the disc drive 100 and thus, is not visible in FIG. 1. The circuitry of FIG. 2 includes a top level programmable processor 118 with associated memory 119. The processor 118 communicates with an application specific integrated circuit (ASIC) 120.

The ASIC 120 includes a clock generator 122 which, in response to an external reference (REF) signal on path 124, generates and outputs an exemplary 500 megahertz (MHz) clock signal ("CLOCK A") on path 126. The clock generator 122 preferably has a phase locked loop (PLL) construction. The CLOCK A signal is provided to a pair of clock divider circuits 128, 130. The clock dividers 128, 130 operate upon the 500 MHz CLOCK A signal to respectively generate a 100 MHz CLOCK B signal on path 132 and a 250 MHz CLOCK C signal on path 134.

The 100 MHz clock signal is provided to internal 100 MHz circuitry 136 within the ASIC 120, and the 250 MHz clock signal is provided to internal 250 MHz circuitry 138 in the ASIC. Since the clock signals generated by the clock dividers 128, 130 can also be provided to circuits external to the ASIC 120, the 250 MHz clock signal is also shown to be provided to the processor 118. It will be understood that the particular clock frequencies shown in FIG. 2 are merely illustrative in nature and are not limiting to the scope of the present invention as claimed below. Moreover, any number of clock dividers can be arranged as desired to provide any number of divided clock frequencies from a single master clock generator.

The ASIC 120 further includes a processor interface (I/F) circuit 140. The I/F circuit 140 passes commands and data between the ASIC 120 and the processor 118 via communication path 142. Of particular interest are a number of signal paths 144, 146, 148 and 150 which respectively transmit an ERROR signal, a RESET signal, a ring length selection (RL) signal and a gate network selection (SEL) signal between the I/F circuit 140 and the clock dividers 128, 130. The manner in which these signals are generated and used will be discussed below.

FIG. 3 provides a functional block diagram of a preferred construction of the clock divider 128 of FIG. 2. It will be understood that the clock divider 130 has nominally the same construction as the clock divider 128. The clock divider 128 includes a variable length ring counter 152, a gate network 154 and an error detection circuit 156. A preferred construction of the ring counter 152 is shown in FIG. 4.

As those skilled in the art will appreciate, a ring counter is typically formed by chaining a number of flip-flops in series. The output of each prior flip-flop is connected to the input of each subsequent flip-flop in the chain. The output of the last flip-flop is routed back as the input of the first flip-flop. The output of each flip-flop is referred to as a "state." By initially setting one of the states high (a logical 1) and the rest of the states low (a logical 0) and applying a common clock input to all of the flip-flops, the logical 1 will successively travel around the ring from state to state at each cycle of the clock.

Figure 4:
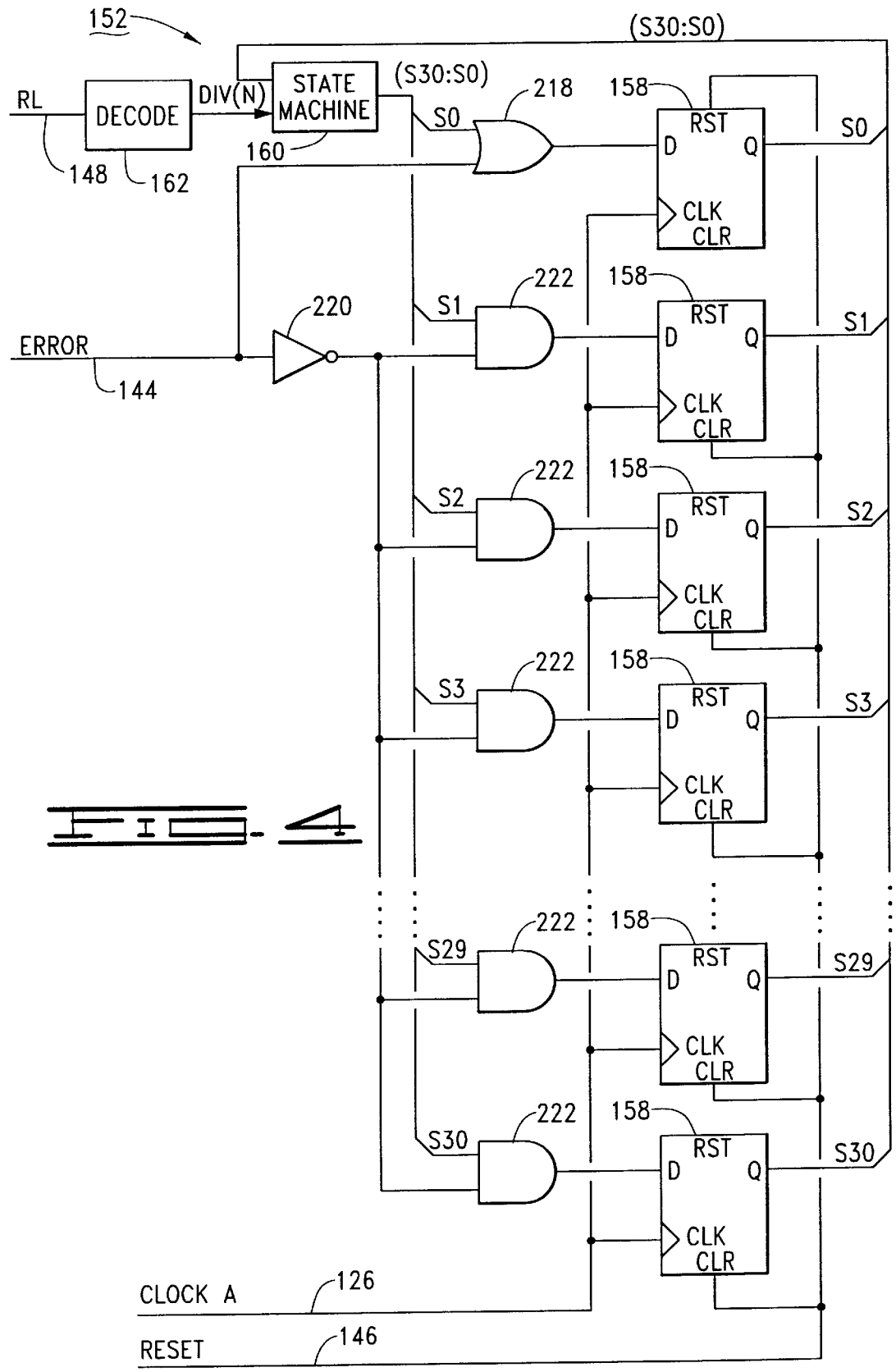
FIG. 4 is a schematic diagram of a preferred construction of the variable length ring counter of FIG. 3.

The ring counter 152 of FIG. 4 is shown to have a total of 31 states labeled S0 through S30, also represented as S30:S0. These states are defined by 31 serially connected D flip-flops 158. However the length of the ring does not necessarily remain fixed at 31 states; rather, a state machine 160 operates to selectively shorten the length of the ring to a number of states less than 31 when desired. This is carried out through the provision of a ring length (RL) input on path 148 to a decode circuit 164 of the ring counter 152. In response to the value of the RL input, the decode circuit 164 outputs a divide signal DIV(n) to the state machine 160.

Figure 5:
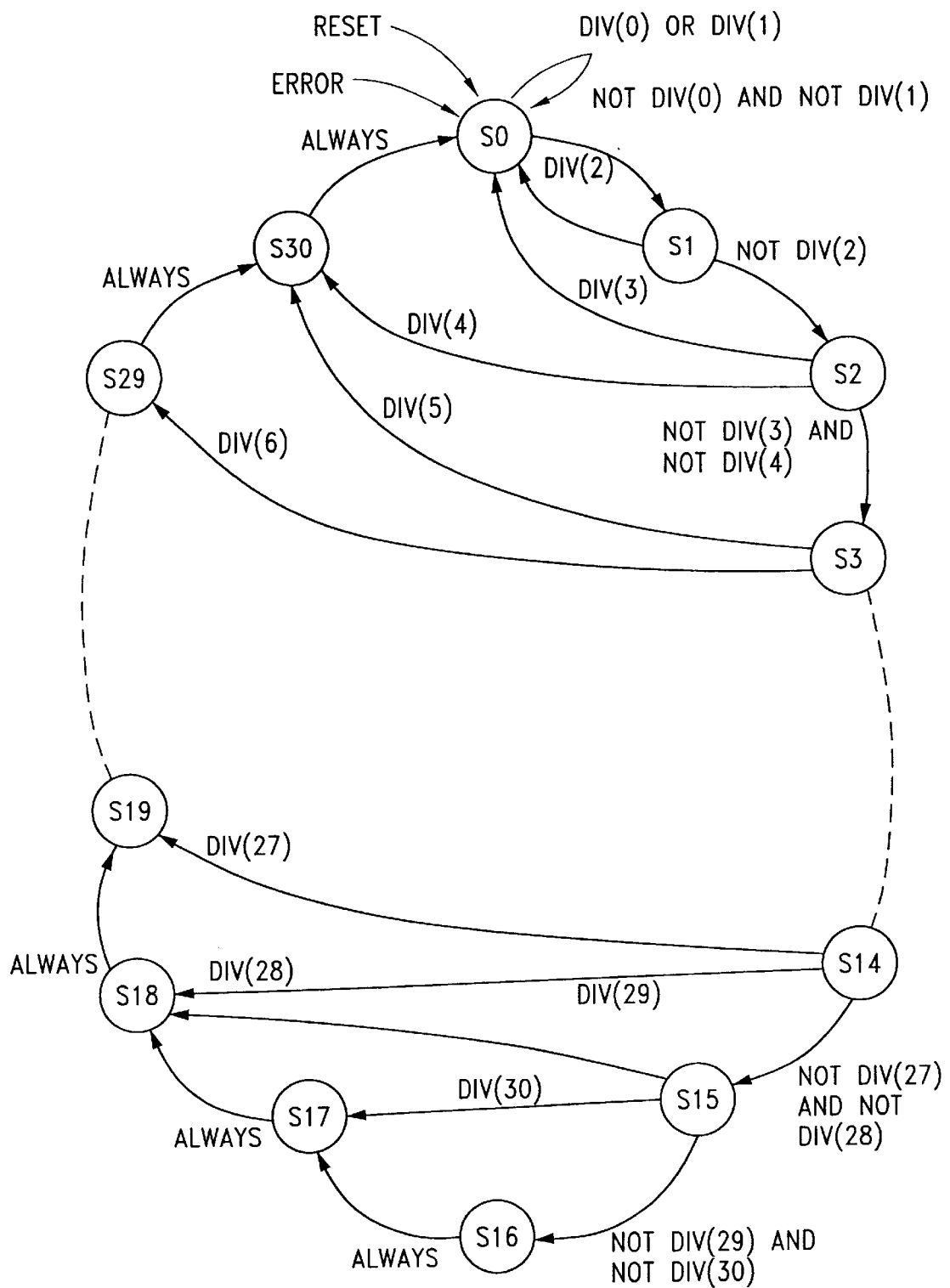
FIG. 5 is a state diagram showing the operation of the state machine of FIG. 4.

FIG. 5 provides a state diagram for various DIV(n) settings of the state machine 160. It can be seen from FIG. 5 that a DIV(4) setting results in a 4-state ring counter (S0, S1, S2 and S30), a DIV(6) setting results in a 6-state ring counter (S0, S1, S2, S3, S29 and S30), and so on. Thus, the processor 118 uses the RL signal to controllably set the length of the ring counter 152 as desired.

FIG. 6 provides a generalized timing diagram to show the steady state operation of the ring counter 152 when all 31 states S30:S0 are selected. The diagram of FIG. 6 is plotted against an elapsed time x-axis 164 and a common amplitude y-axis 166. The CLOCK A signal on path 126 is shown by waveform 168. It is assumed that the D flip-flops 158 transition from input to output on a rising clock edge (i.e., D=Q at CLK↑). Hence, rising edges 170 in the CLOCK A waveform 168 trigger high pulses 172 in state 0 (S0) waveform 174.

The next rising edge 176 in the CLOCK A waveform 168 causes the S0 waveform 174 to go low and correspondingly induces a high pulse 178 in an S1 waveform 180. Subsequent rising edges in the CLOCK A waveform 168 in turn induce a high pulse 182 in S2 waveform 184, a high pulse 186 in S3 waveform 188, a high pulse 190 in S4 waveform 192, and so on until a high pulse 194 is induced in an S30 waveform 196, after which another high pulse 172 is induced in S0 waveform 174. Thus, the operation of the ring counter 158 can be thought of as causing a single pulse to travel around the ring at a frequency determined by the CLOCK A input.

FIG. 6 further shows a ¼ CLOCK A signal waveform 198 having a frequency that is one-fourth that of the CLOCK A waveform 168. The waveform 198 can be formed in a number of ways; one preferred approach is to use a DIV(4) setting to set the ring counter 152 to a length of four states (S0, S1, S2 and S30), and then perform an exclusive-or (XOR) logical operation upon states S0 and S1. As will be recognized, an XOR operation outputs a logical 0 when the two inputs are the same, and outputs a logical 1 when the two inputs are different. Since the states S0 and S1 are different for two clock periods of CLOCK A and then are the same for the next two clock periods of CLOCK A, this configuration provides a relatively straightforward way to divide the frequency of CLOCK A by four. Since the CLOCK A signal 168 is contemplated as having a frequency of 500 MHz, the ¼ CLOCK A signal 198 will have a frequency of 500/4, or 125 MHz. The XOR operation is carried out within the gate network 154 (FIG. 3) in response to the SEL input on path 150. It will be understood that the clock dividers 128, 130 are advantageously configured to adaptively output any number of clock patterns and frequencies depending upon the RL and SEL inputs from the processor 118.

Figure 7:
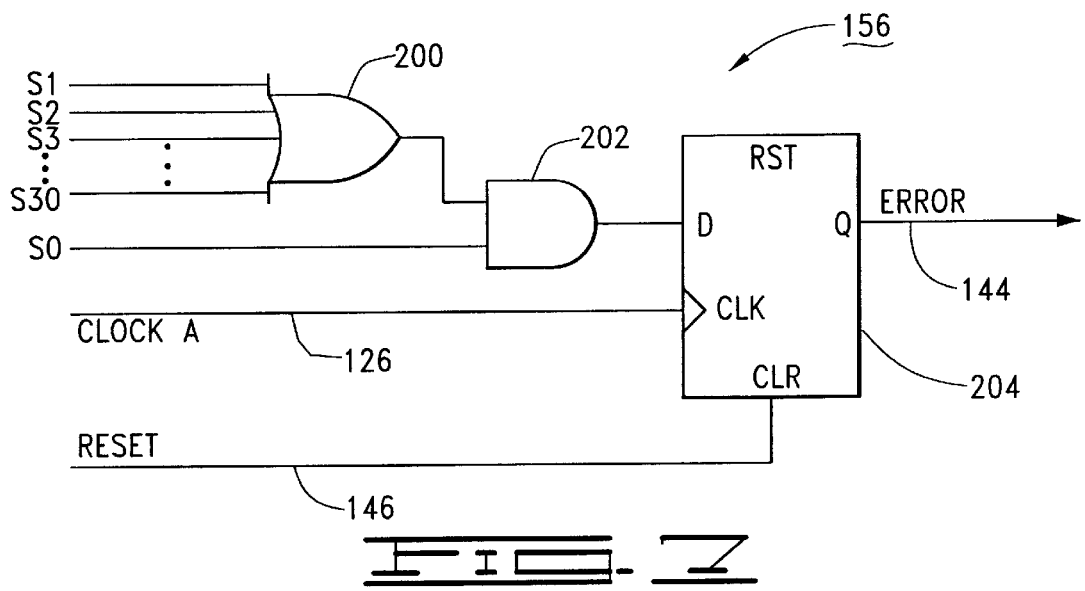
FIG. 7 is a schematic diagram of the error detection circuit of FIG. 3 in accordance with a preferred embodiment.

Referring now to FIG. 7, shown therein is a preferred construction for the error detection circuit 156 of FIG. 3. The error detection circuit 156 of FIG. 7 includes an OR gate 200, an AND gate 202 and a D flip-flop 204 (similar in construction to the D flip-flops 158 shown in FIG. 4). The circuit of FIG. 4 performs a logical OR operation using OR gate 200 upon all of the states except one (in this case, states S30:S1), and the result is ANDed using AND gate 202 with the remaining one of the states (in this case, state S0). The output of the AND gate 202 is provided as the input to the flip-flop 204.

As will be recognized, a logical OR operation is analogous to an addition step. Hence, the output of the OR gate 200 will be a logical 0 if all of the inputs are at a logical 0, and will be at a logical 1 if at least one of the inputs are at a logical 1. Since a logical AND operation is analogous to a multiplication step, the output of the AND gate will be a logical 1 only if both inputs are also set at a logical 1.

The error detection circuit 156 of FIG. 7 advantageously operates to detect the presence of more than one high pulse in the ring counter 152 at a time, regardless of the operational length of the ring. For example, an anomalous event such as a power surge could initially set a state high that should normally be low, in which case there would be two pulses traveling around the ring. Eventually, one of these pulses will reach state S0. At this point the input to the AND gate 202 from the state S0 will be high. The input from the OR gate 200 will also be high due to the high pulse on one of the remaining states. The resulting output from the AND gate 202 will thus also be high, and this high level will be transferred (via the flip flop 204) as a high level on the ERROR signal path 144 indicating an error condition has been detected.

Figure 8:
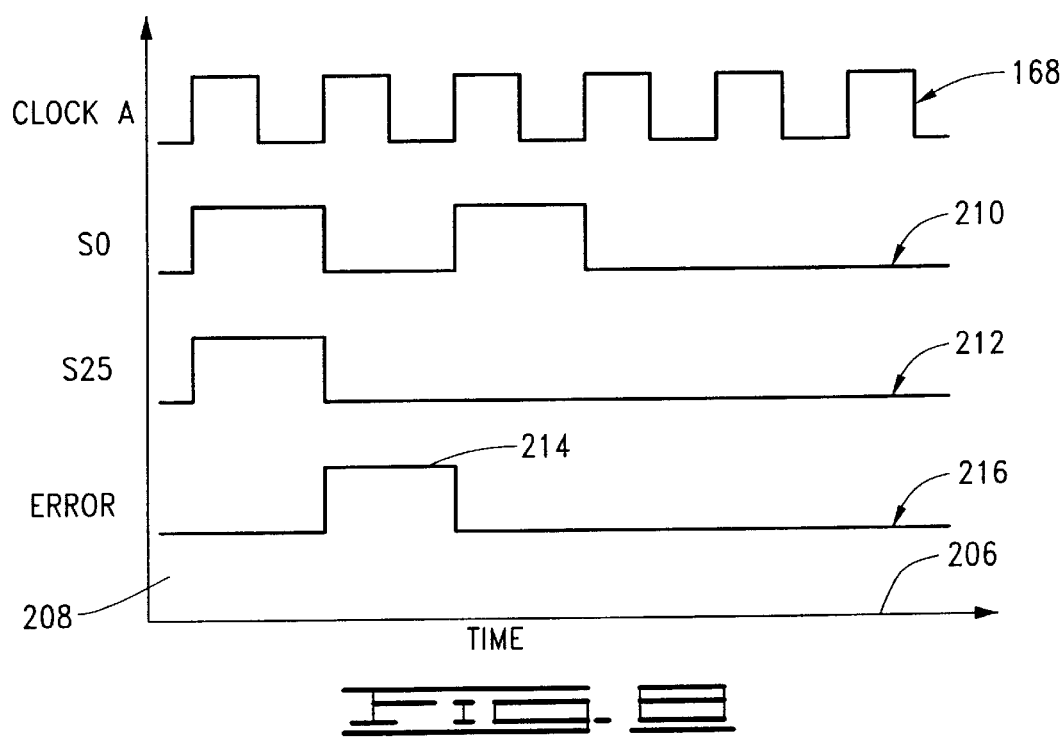
FIG. 8 is a timing diagram generally illustrating operation of the error detection circuit of FIG. 7.

FIG. 8 provides a generalized timing diagram to illustrate this operation. The waveforms in FIG. 8 are plotted against an elapsed time x-axis 206 and a common amplitude y-axis 208. Assuming that the two pulses in the ring counter 152 are six states apart, at some point the leading pulse will reach state S0 as the trailing pulse reaches state S25, as represented by respective waveforms 210, 212 in FIG. 6. This will result in a high level input to the flip-flop 204 in FIG. 7. The next clock transition will induce a high level pulse 214 in an ERROR signal waveform 216.

The high level in the ERROR signal is preferably latched in a flip-flop (not shown) in the processor I/F circuitry 140 (FIG. 2). When the processor 118 subsequently polls the flip-flop, the processor will be informed that an error detection was detected. In the meantime, the ERROR signal on path 144 will be used to synchronously (automatically) reinitialize the ring counter 152 to an initial state. This operation can be observed with reference again to FIG. 4.

When the ERROR signal on path 144 is asserted high, state S0 is set to a logical 1 through the operation of an OR gate 218. The remaining states S30:S1 are each set to a logical 0 through the operation of an inverter 220 and an array of AND gates 222. This reinitialization sequence resolves the erroneous condition and causes the ring counter 152 to resume steady-state operation at the next rising clock pulse.

It will be noted that while the clock divider circuits 128, 130 have the capability of performing a synchronous reset, the circuits are further configured to be asynchronously (externally) reset by the processor 118. This advantageously allows the processor 118 to reset the circuits after some condition has been reached; for example, the processor 118 could be programmed to execute an asynchronous reset once a particular number of ERROR conditions are reported to the processor 118 over a given amount of time.

The circuits 128, 130 are asynchronously reset by the assertion of a high level (logical 1) on the RESET path 146. As shown in FIGS. 4 and 7, this RESET level is provided to the clear (CLR) input of each of the flip-flops 158, 204 except for one (the flip-flop 158 associated with state S0 receives the RESET at the reset (RST) input). Thus, the Q output states of the flip-flop 204 in FIG. 7 and the flip-flops for states S30:S1 are set to logical 0, and the Q output state for the flip-flop 158 associated with state S0 is set to logical 1. The circuits 128, 130 thereafter resume normal steady-state operation at the next clock pulse.

Figure 9:
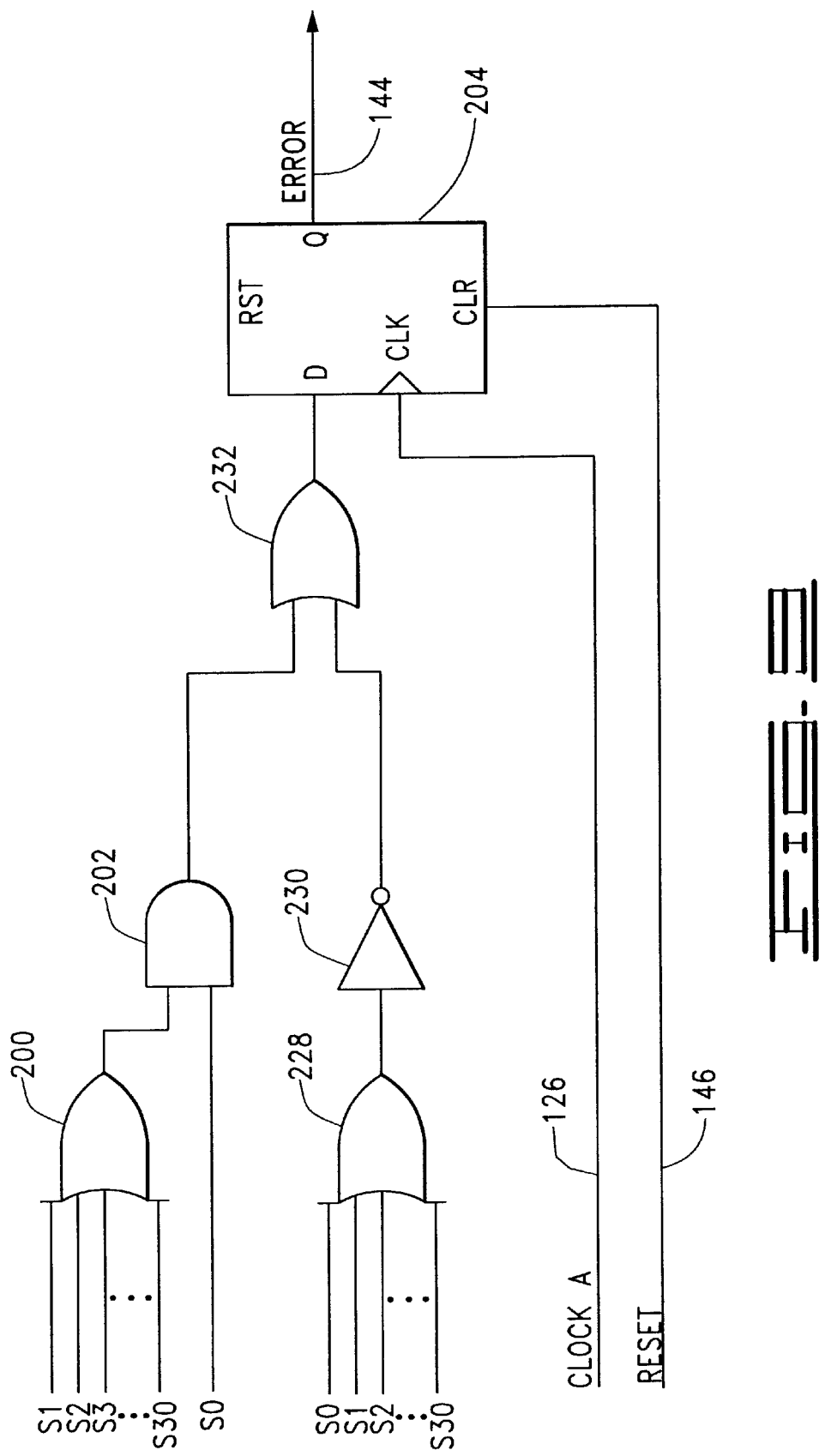
FIG. 9 is a schematic diagram of the error detection circuit of FIG. 3 in accordance with another preferred embodiment of the present invention.

FIG. 9 provides an alternative preferred embodiment of the error detection circuit of FIG. 3 (the embodiment in FIG. 9 is numerically denoted as 226). The circuit 226 is similar to the circuit 156 of FIG. 3 except with the additional provision of an OR gate 228 which receives all 31 states S30:S0, an inverter 230 which inverts the output of the OR gate 228 and an OR gate 232 which combines the output of the inverter 230 with the output of the AND gate 202.

The OR gate 200 and the AND gate 202 operate as described above to detect the presence of more than one pulse on the ring counter 152 (once one of the pulses reaches state S0). The OR gate 228 and the inverter 230 further operate to detect an error condition in which there are no pulses on the ring counter 152 due to some undesired anomalous event. When all of the states S30:S0 (or whatever subset of states are active) are at a low logic state, the output of the OR gate 228 will also be low. The inverter 230 will invert this to a high state and will pass this (via the OR gate 232) to the input of the flip-flop 204. In this way, the error detection circuit 226 detects either the presence of too many or too few pulses on the ring counter 152.

Figure 10:
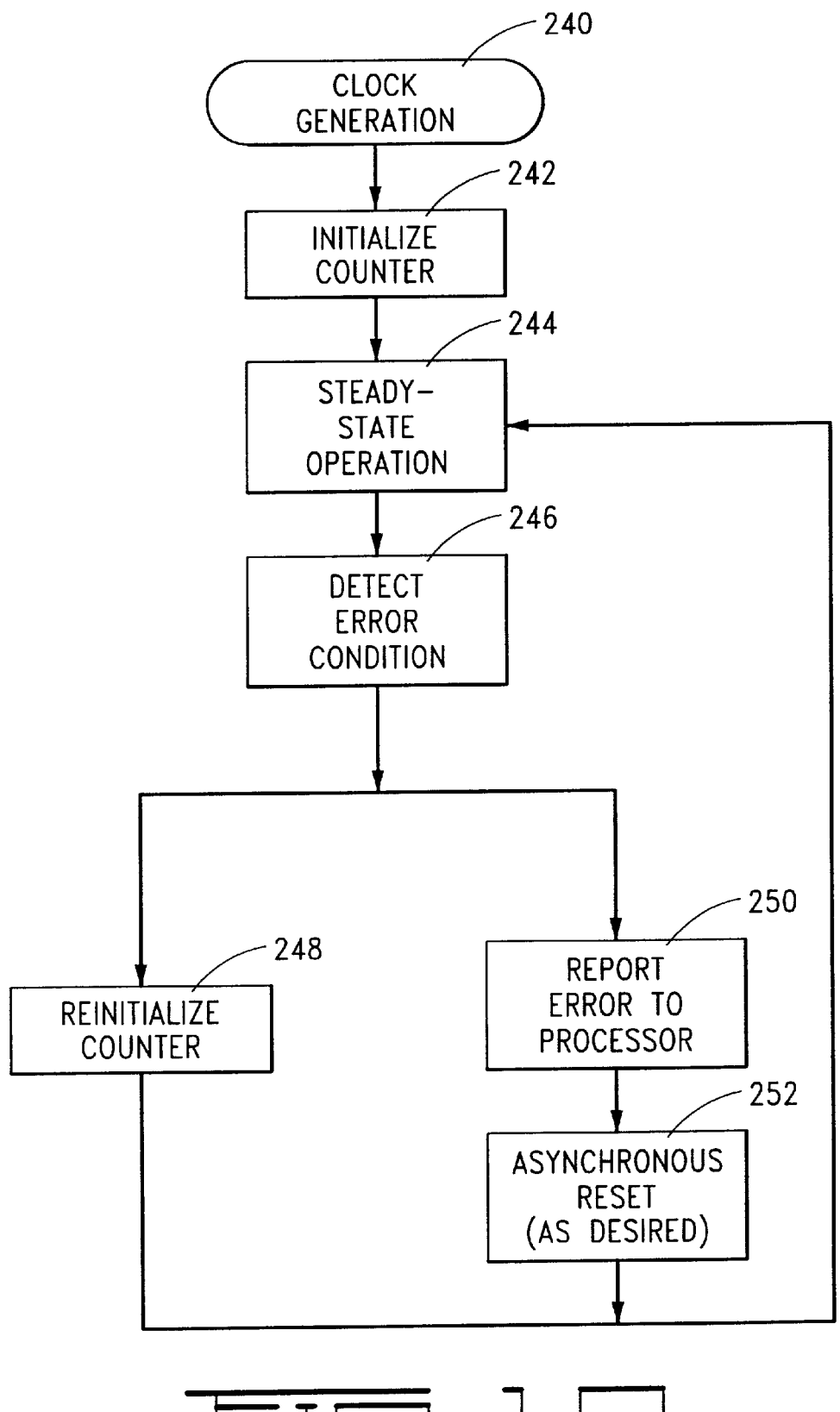
FIG. 10 is a flow chart for a CLOCK GENERATION routine illustrative of steps carried out during the operation of the circuit of FIG. 3.

FIG. 10 provides a flow chart for a CLOCK GENERATION routine 240, generally illustrative of steps carried out by the circuitry of FIG. 2 in accordance with preferred embodiments of the present invention. An initialization step is first carried out at step 242. This step includes provision of a high level to state S0 in the respective ring counters 152 in the clock divider circuits 128, 130, as well as the entering of the desired RL and SEL settings to set the lengths of the rings and to configure the respective gate networks 154 to provide the desired divided output clock frequencies.

The circuitry of FIG. 2 thereafter proceeds with steady-state operation during which the clock dividers 128, 130 provide the aforementioned CLOCK A and CLOCK B signals. During this operation the respective error detection circuits 156, 226 operate in the background to monitor the ring counters 152 for the presence of an error condition. Once an error condition is detected, as shown at step 246, the routine proceeds with the synchronous reinitialization of the respective ring counter 152 at step 248. This is carried out as discussed above with respect to FIGS. 7 and 8; a high ERROR signal forces state S0 to a high logic state and forces states S30:S1 to a low logic state.

As shown by step 250, the detection of an error condition also results in the reporting of this error to the processor 118 (via the I/F circuitry 140). The processor 118 can then elect to initiate an asynchronous reset of the system by asserting a high RESET signal on path 146, as shown by step 252. The routine then returns to steady-state operation at step 244 until detection of the next error condition event.

It will now be understood that the present invention (as embodied herein and as claimed below) is directed to an apparatus and method for generating a divided clock signal.

In accordance with preferred embodiments, a ring counter (such as 152) comprises a ring of serially connected elements (such as 158) clocked by a master clock signal (such as 168) with each element having a corresponding output state (such as S30:S0). During steady-state operation a different one of the output states is set at a first logical level (such as a logical 1) and each of the remaining output states is set at a second logical level (such as a logical 0) at each successive clock transition (such as 170, 176) in the master clock signal. A gate network (such as 154) uses the respective logical levels of the output states to generate the divided clock signal.

An error detection circuit (such as 156, 226) provides an error detection signal (such as 216 on path 144) indicative of an error condition when a number of the output states at the first logical level is not equal to one. The error detection circuit further synchronously resets the ring counter so that one of the output states is set at the first logical level and the remaining output states are set at the second logical level in response to the detection of the error condition.

Preferably, the ring counter is further configured to be asynchronously reset by an external processor device in response to the error detection signal. The ring of elements preferably comprises a sequence of serially connected flip-flops each having an input and an output, wherein the output of each flip-flop in the sequence is connected to the input of the next flip-flop in the sequence. The ring counter is preferably characterized as a variable length ring counter so that less than all of the flip-flops and associated output states can be selected during operation.

The error detection circuit preferably comprises an OR gate (such as 200) configured to perform a logical OR operation upon all of the states except for one, and comprises an AND gate (such as 202) configured to perform a logical AND operation upon the remaining one of said states. The error detection signal is generated in response to the result of the logical AND operation. The clock divider circuit is preferably embedded in an integrated circuit (such as 120) which further embeds a master clock generator circuit (such as 122) that generates the master clock signal.

In accordance with other preferred embodiments, a method for generating a divided clock signal comprises steps of 15. A method for generating a divided clock signal from a master clock signal, comprising steps of initiating a ring counter (such as 152) comprising a ring of serially connected elements (such as 158) clocked by a master clock signal (such as 168), each element having a corresponding output state (such as by step 242 in FIG. 10); operating the ring counter so that a different one of the output states is set at a first logical level and each of the remaining output states is set at a second logical level at each successive clock transition in the master clock signal and using the respective logical levels of at least selected ones of the output states to generate the divided clock signal (such as by step 244); detecting an error condition when a number of the output states at the first logical level is not equal to one after a given clock transition (such as by step 246); and resetting the ring counter in response to the detected error condition by setting a selected one of the output states to the first logical level and by setting the remaining output states to the second logical level (such as by step 248).

Additionally, the method preferably includes steps of reporting the error condition (such as by step 250) to a programmable processor device (such as 118); and by performing an asynchronous reset of the ring counter (such as by step 252).

For purposes of the appended claims, the structure that carries out the recited function of the "first means" will be understood as corresponding to the disclosed error detection circuits 156, 226 of FIGS. 3, 7 and 9 and the logic gates 218, 220 and 222 in FIG. 4.

While numerous characteristics and advantages of the several embodiments of the present invention have been set forth herein, along with details of the structure and function thereof, it will be understood that this is illustrative only, and that changes may be made in detail, especially in matters of structure and arrangements of parts, within the principles of the present invention to the full extent indicated by the broad general meaning of the terms in which the appended claims are expressed. That is, the particular elements may vary depending on the particular application for the divided clock circuit, while maintaining the same functionality without departing from the spirit and scope of the present invention.

In addition, although the embodiments described herein are directed to a divided clock circuit for use in a disc drive, it will be appreciated by those skilled in the art that the circuit can be used in other electronics systems without departing from the spirit and scope of the claimed invention.

What is claimed is:

1. A clock divider circuit which provides a divided clock signal from a master clock signal, the clock divider circuit comprising:

a ring counter comprising a ring of serially connected elements clocked by the master clock signal with each element having a corresponding output state, wherein during steady-state operation a different one of the output states is set at a first logical level and each of the remaining output states is set at a second logical level at each successive clock transition in the master clock signal;

a gate network coupled to the ring counter and which uses the respective logical levels of the output states to generate the divided clock signal; and an error detection circuit coupled to the ring counter and which provides an error detection signal indicative of an error condition when a number of the output states at the first logical level is not equal to one.

2. The clock divider circuit of claim 1, wherein the error detection circuit provides the error detection signal in response to the presence of at least two output states at the first logical level.

3. The clock divider circuit of claim 1, wherein the error detection circuit provides the error detection signal in response to the presence of no output states at the first logical level.

4. The clock divider circuit of claim 1, wherein the error detection signal synchronously resets the ring counter so that one of the output states is set at the first logical level and the remaining output states are set at the second logical level.

5. The clock divider circuit of claim 4, wherein the ring counter is further configured to be asynchronously reset by an external processor device in response to the error detection signal.

6. The clock divider circuit of claim 1, wherein the ring of elements comprises a sequence of serially connected flip-flops each having an input and an output, wherein the output of each flip-flop in the sequence is connected to the input of the next flip-flop in the sequence.

7. The clock divider circuit of claim 6, wherein the ring counter is characterized as a variable length ring counter so that, in response to a ring length selection signal, less than all of the flip-flops and associated output states are active in the ring during steady-state operation, and wherein the error detection circuit provides the error detection signal when the number of the active output states at the first logical level is a number other than one.

8. The clock divider circuit of claim 1, wherein the error detection circuit comprises an OR gate configured to perform a logical OR operation upon all of the states except for a remaining one of said states, wherein the error detection circuit further comprises an AND gate configured to perform a logical AND operation upon the remaining one of said states and the result of the logical OR operation, and wherein the error detection signal is generated in response to the result of the logical AND operation.

9. The clock divider circuit of claim 1, wherein the clock divider circuit is embedded in an integrated circuit which further embeds a master clock generator circuit that generates the master clock signal.

10. A disc drive, comprising:
   a controllably positionable data transducing head adjacent a recording surface;
   a digital circuit coupled to the head to control transfer of data between the recording surface and a host device;
   a master clock generator which generates a master clock signal;
   a ring counter comprising a ring of serially connected elements clocked by the master clock signal with each element having a corresponding output state, wherein during steady-state operation a different one of the output states is set at a first logical level and each of the remaining output states is set at a second logical level at each successive clock transition in the master clock signal;
   a gate network coupled to the ring counter and which uses the respective logical levels of the output states to provide a divided clock signal to the digital circuit; and
   first means for detecting an error condition in the ring counter when a number of the output states at the first logical level is not equal to one, and for synchronously resetting the ring counter in response to the error condition by setting a selected one of the output states to the first logical level and by setting the remaining output states to the second logical level.

11. The disc drive of claim 10, wherein the first means comprises:
   an OR gate configured to perform a logical OR operation upon all of the states except for a remaining one of said states;
   an AND gate configured to perform a logical AND operation upon the remaining one of said states and the result of the logical OR operation; and
   a flip-flop which asserts an error detection signal when the result of the logical AND operation indicates the number of the output states at the first logical level is more than one.

12. The disc drive of claim 10, further comprising a programmable processor device configured to control operation of the digital circuit, wherein the programmable processor device is configured to asynchronously reset the ring counter in response to the error condition.

13. The disc drive of claim 10, wherein the ring of elements comprises a sequence of serially connected flip-flops each having an input and an output, wherein the output of each flip-flop in the sequence is connected to the input of the next flip-flop in the sequence.

14. The disc drive of claim 13, wherein the ring counter is characterized as a variable length ring counter so that, in response to a ring length selection signal, less than all of the flip-flops and associated output states are active in the ring during steady-state operation, and wherein the first means detects the error condition when the number of the active output states at the first logical level is a number other than one.

15. A method for generating a divided clock signal from a master clock signal, comprising steps of:
   (a) providing a ring counter comprising a ring of serially connected elements clocked by the master clock signal, each element having a corresponding output state;
   (b) operating the ring counter so that a different one of the output states is set at a first logical level and each of the remaining output states is set at a second logical level at each successive clock transition in the master clock signal;
   (c) using the respective logical levels of at least selected ones of the output states to generate the divided clock signal;
   (d) detecting an error condition when a number of the output states at the first logical level is not equal to one after a given clock transition; and
   (e) resetting the ring counter in response to the detected error condition by setting a selected one of the output states to the first logical level and by setting the remaining output states to the second logical level.

16. The method of claim 15, wherein the detecting step (d) further comprises a step of generating an error detection signal indicative of the presence of the error condition in the ring counter.

17. The method of claim 16, further comprising a step of (f) providing the error detection signal to a programmable processor device.

18. The method of claim 17, further comprising a step of (g) using the programmable processor device to asynchronously reset the ring counter in response to the error detection signal.

19. The method of claim 15, wherein the detecting step (d) comprises a step of detecting the error condition when at least two output states are at the first logical level.

20. The method of claim 15, wherein the detecting step (d) comprises a step of detecting the error condition when no output states are at the first logical level.

* * * * *